United States Patent
Takemura

(10) Patent No.: US 10,620,577 B2
(45) Date of Patent: Apr. 14, 2020

(54) METHOD FOR CONTROLLING DENSITY OF IMAGE TO BE FORMED BY IMAGE FORMING APPARATUS HAVING DEVELOPER AND HUMIDITY SENSORS

(71) Applicant: CANON KABUSHIKI KAISHA, Tokyo (JP)

(72) Inventor: Taichi Takemura, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/124,746

(22) Filed: Sep. 7, 2018

(65) Prior Publication Data
US 2019/0086851 A1 Mar. 21, 2019

(30) Foreign Application Priority Data

Sep. 20, 2017 (JP) ................. 2017-180395

(51) Int. Cl.
| | | |
|---|---|---|
| G03G 15/00 | (2006.01) | |
| H04N 1/407 | (2006.01) | |
| G03G 15/08 | (2006.01) | |
| H04N 1/60 | (2006.01) | |

(52) U.S. Cl.
CPC ..... *G03G 15/5041* (2013.01); *G03G 15/0887* (2013.01); *G03G 15/5025* (2013.01); *H04N 1/4078* (2013.01); *G03G 2215/00067* (2013.01); *H04N 1/6036* (2013.01)

(58) Field of Classification Search
CPC ................. G03G 15/5041; G03G 15/0887
USPC ...................... 399/44, 49; 358/1.9
See application file for complete search history.

(56) References Cited

U.S. PATENT DOCUMENTS

| | | | |
|---|---|---|---|
| 6,418,281 B1 | 7/2002 | Ohki | |
| 8,107,837 B2* | 1/2012 | Hirai | G03G 15/5041 399/49 |
| 8,194,299 B2* | 6/2012 | Yamashita et al. | H04N 1/4078 358/1.9 |
| 9,250,593 B2* | 2/2016 | Mase | G03G 15/5041 |
| 9,897,956 B2 | 2/2018 | Takemura | |
| 2018/0129154 A1 | 5/2018 | Tomii et al. | |

FOREIGN PATENT DOCUMENTS

JP 2000-238341 A 9/2000

* cited by examiner

*Primary Examiner* — William J Royer
(74) *Attorney, Agent, or Firm* — Venable LLP

(57) ABSTRACT

An apparatus converts image data based on a conversion condition, forms an image using a developer, measures the developer, and measures humidity. The apparatus determines a first density of an image when a mode of the apparatus changes from a power saving mode in which the apparatus cannot form an image to a normal mode in which the apparatus can form an image, from values measured, based on a first determination condition, determines a second density of an image when the apparatus has formed images on a predetermined number of sheets in the normal mode, from values measured, based on a second determination condition that is different from the first determination condition, and generates the conversion condition based on the first density and the second density.

11 Claims, 11 Drawing Sheets

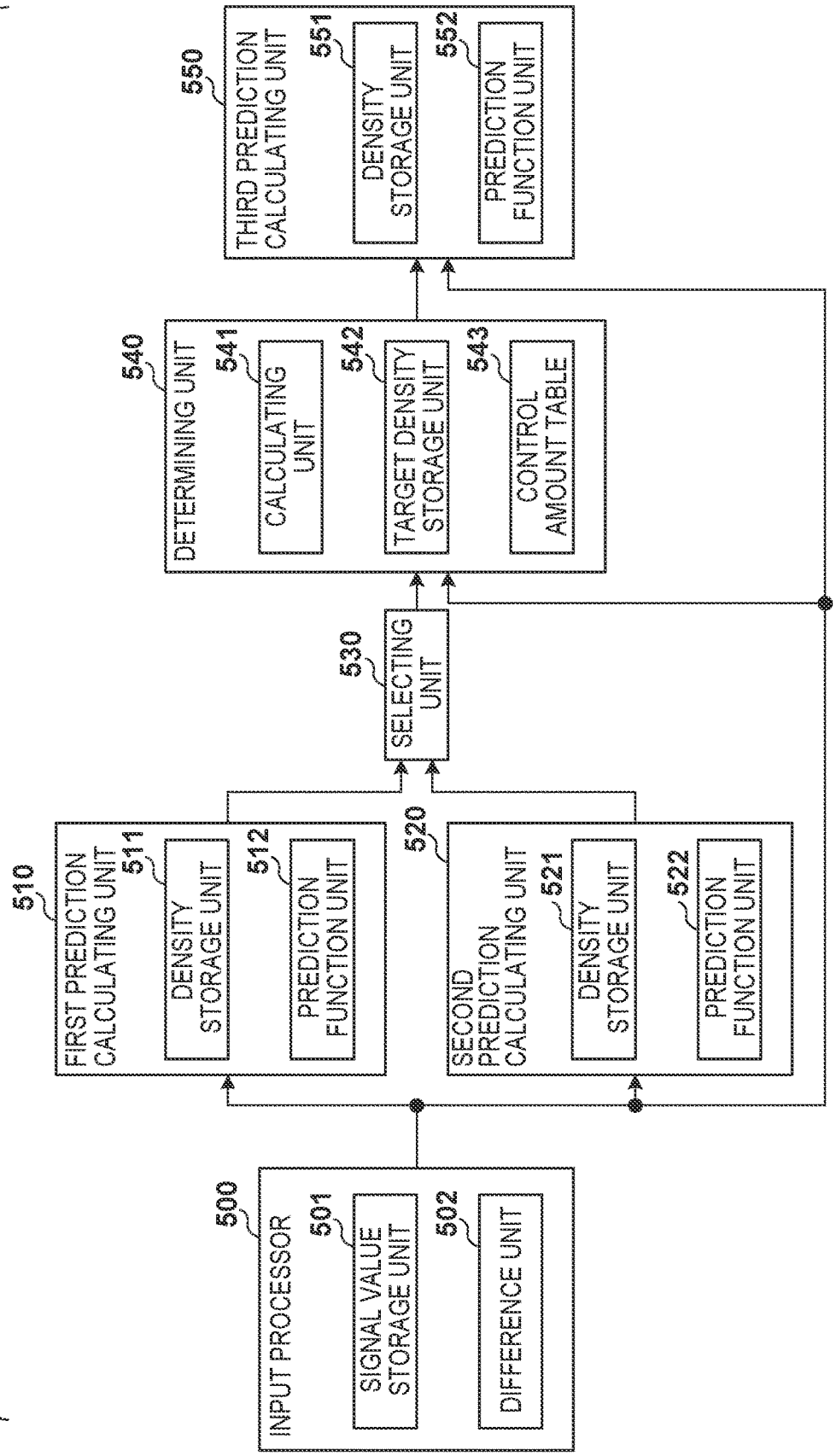

FIG. 10

| | LPW | TONER DENSITY | Vd | APPARATUS TEMPERATURE | HUMIDITY OUTSIDE APPARATUS |
|---|---|---|---|---|---|
| REFERENCE POINT | 112 | 1.6 | 557 | 30.3 | 26.61 |
| PREDICTION POINT | 104 | 1.53 | 727 | 27.58 | 24.03 |
| DIFFERENCE DATA | -8 | -0.07 | 170 | -2.72 | -2.58 |
| MODEL COEFFICIENT | 0.0024 | -0.1239 | 0.0005 | -0.0170 | 0.0021 |
| PREDICTED DIFFERENCE | -0.019 | 0.009 | 0.077 | 0.046 | -0.005 |

METHOD FOR CONTROLLING DENSITY OF IMAGE TO BE FORMED BY IMAGE FORMING APPARATUS HAVING DEVELOPER AND HUMIDITY SENSORS

BACKGROUND OF THE INVENTION

Field of the Invention

The present invention relates to a method for controlling the density of an image to be formed by an image forming apparatus.

Description of the Related Art

The maximum density and gradation characteristics of images change in accordance with a change in an environment in which an image forming apparatus is installed and wear of its components. Thus, the image forming apparatus executes calibration, and thereby maintains the maximum density of images at a target density and maintains the gradation characteristics at a target level.

U.S. Pat. No. 6,418,281 proposes calibration such that a gradation pattern is formed on a sheet and read, and information of the gradation pattern that was read is fed back to image formation conditions. A timing at which calibration is required is when the environment changes and when the image forming apparatus is left unattended for a long time. A timing at which an environmental change particularly tends to occur is when the image forming apparatus is powered on or returns from an energy-saving mode.

In general, in calibration, an image forming apparatus forms a pattern image, measures the pattern image, and updates image formation conditions in accordance with the measurement result. Thus, calibration causes a long downtime. "Downtime" refers to a time period during which a user cannot freely form an image. If a toner image is formed without executing calibration, the density of the toner image will likely deviate from the target density.

SUMMARY OF THE INVENTION

The present invention provides an image forming apparatus comprising: a converting unit configured to convert image data based on a conversion condition; an image forming unit configured to form an image using a developer; a first sensor configured to measure the developer in the image forming unit; a second sensor configured to measure a humidity; and a controller configured to: determine a first density of an image to be formed by the image forming unit when a mode of the image forming apparatus changes from a power saving mode in which the image forming apparatus cannot form an image to a normal mode in which the image forming apparatus can form an image, from a value measured by the first sensor and a value measured by the second sensor, based on a first determination condition, determine a second density of an image to be formed by the image forming unit when the image forming apparatus has formed images on a predetermined number of sheets in the normal mode, from the value measured by the first sensor and the value measured by the second sensor, based on a second determination condition that is different from the first determination condition, and generate the conversion condition based on the first density and the second density.

Further features of the present invention will become apparent from the following description of exemplary embodiments with reference to the attached drawings.

BRIEF DESCRIPTION OF THE DRAWINGS

FIG. 5 is a diagram illustrating functions associated with prediction of the image density.

FIG. 10 is a diagram showing parameters used to obtain a control amount.

DESCRIPTION OF THE EMBODIMENTS

In this embodiment, an electrophotographic image forming apparatus is used for convenience of description. However, characteristic aspects of control, in particular, matters stated in the claims, can also be applied to an inkjet printer, a dye sublimation printer, and the like. That is, the present invention can be applied to an image formation method with which an image density fluctuates in relation with a change in an environmental condition or the like.

<Image Forming Apparatus>

Figure 1:
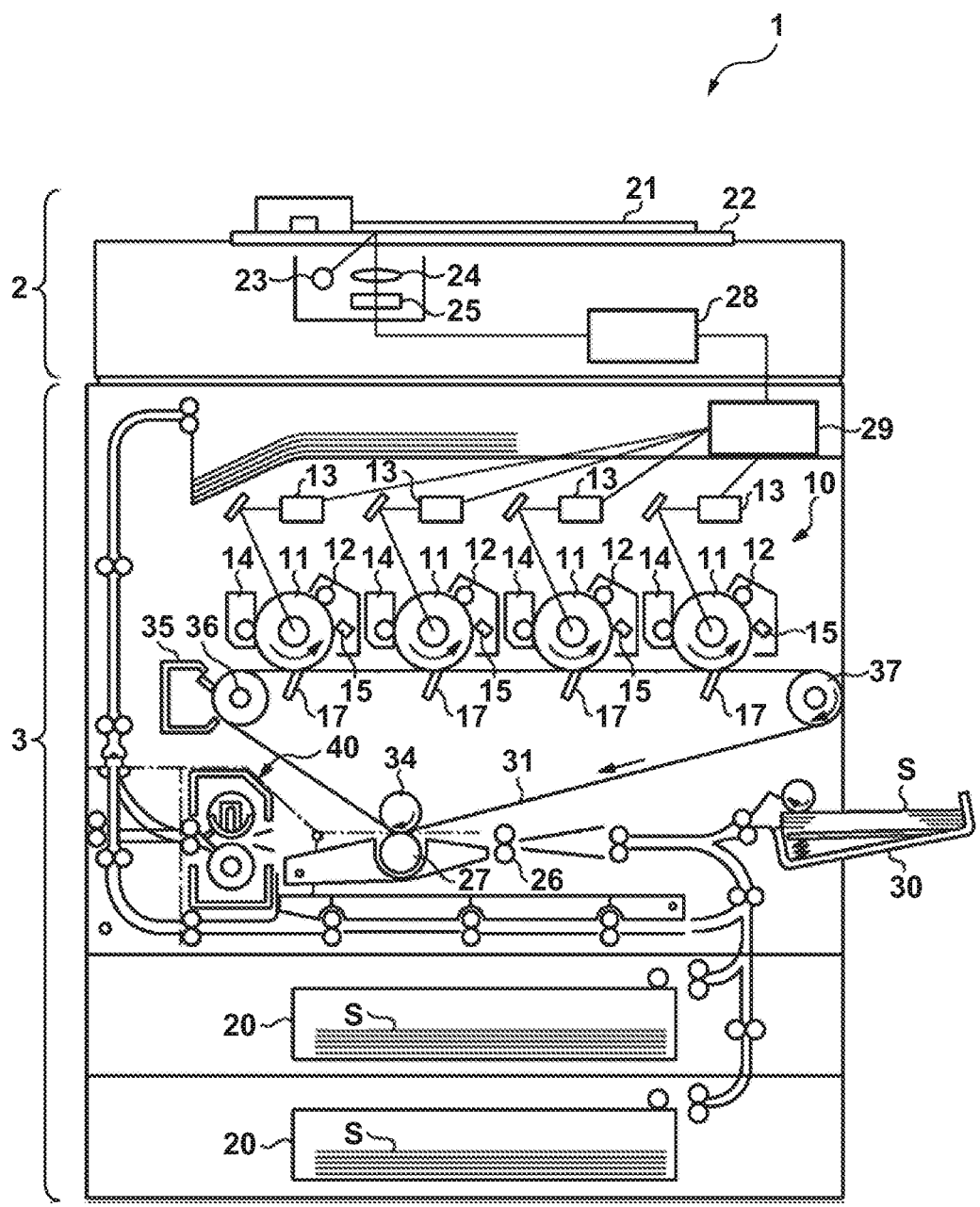
FIG. 1 is a diagram illustrating an image forming apparatus.

FIG. 1 is a schematic cross-sectional view of an image forming apparatus 1. The image forming apparatus 1 includes a reader 2 and a printer 3. The reader 2 is a reading apparatus configured to read an original and a test chart. A "test chart" refers to a sheet on which a plurality of pattern images are formed. A light source 23 emits light onto an original 21 placed on a platen glass 22. An optical system 24 guides light reflected from the original 21 to a CCD sensor 25 and causes the CCD sensor 25 to form an image. "CCD" is an abbreviation for charge-coupled device. The CCD sensor 25 generates red, green, and blue color component signals. A reader image processor 28 executes image processing (e.g., shading correction) on the color component signals obtained by the CCD sensor 25, and generates image data. The reader image processor 28 transfers the image data to a controller 29 of the printer 3.

The printer 3 forms a toner image on a sheet S based on the image data. The printer 3 includes an image forming unit 10 configured to form a Y (yellow) toner image, a M (magenta) toner image, a C (cyan) toner image, and a Bk (black) toner image. Note that the image forming unit 10 includes an image forming station for forming a yellow image, an image forming station for forming a magenta image, an image forming station for forming a cyan image, and an image forming station for forming a black image. Also, the printer 3 of the present invention is not limited to a color printer configured to form a full color image, and may be a monochrome printer configured to form a single color image. As shown in FIG. 1, four image forming stations corresponding to the colors Y, M, C, and Bk are disposed in the image forming unit 10 from the left. The configurations of the four image forming stations are all similar, and thus the image forming station configured to form a black image will be described herein. The image forming station includes a photosensitive drum 11. The photosensitive drum 11 is also called a photoreceptor or an image carrier. A charger 12, a laser scanner 13, a developing device 14, a primary transfer device 17, and a drum cleaner 15 are disposed around the photosensitive drum 11. The charger 12 includes a charging roller configured to charge a surface of the photosensitive drum 11. The laser scanner 13 includes a light source, a mirror, and a lens. The developing device 14 includes a case for accommodating or accumulating a developer (toner) and a developing roller for carrying the developer in the case. A development bias is applied to the developing roller. The primary transfer device 17 includes a transfer member to which a transfer bias (primary) is supplied. Note that the transfer member is a transfer blade or a transfer roller, for example. The drum cleaner 15 includes a cleaning blade for removing toner on the surface of the photosensitive drum 11.

Next, a process in which the black image forming station forms a toner image will be described. Note that processes in which image forming stations for colors other than black form toner images are also similar to this process, and thus description thereof will be omitted. When image formation is started, the photosensitive drum 11 rotates in the direction of the arrow. The charger 12 evenly charges the surface of the photosensitive drum 11. The laser scanner 13 outputs laser light based on the image data output from the controller 29 and exposes the surface of the photosensitive drum 11 with laser light. Accordingly, an electrostatic latent image is formed on the photosensitive drum 11. The developing device 14 develops an electrostatic latent image using toner and forms a toner image. The primary transfer device 17 transfers the toner image carried by the photosensitive drum 11 to an intermediate transfer belt 31. The intermediate transfer belt 31 functions as an intermediate transfer member to which the toner image is transferred. The intermediate transfer belt 31 is wrapped around three rollers 34, 36, and 37. The drum cleaner 15 removes toner that remains on the photosensitive drum 11 without being transferred to the intermediate transfer belt 31 by the primary transfer device 17.

The sheet S is placed in feeding cassettes 20 or a multi-feeding tray 30. A feeding roller feeds the sheet S from the feeding cassette 20 or the multi-feeding tray 30. The sheet S fed by the feeding roller is conveyed toward a registration roller 26 by a conveyance roller. The registration roller 26 conveys the sheet S to a transfer nip portion between the intermediate transfer belt 31 and a secondary transfer device 27 such that the toner image on the intermediate transfer belt 31 is transferred to the sheet S. The secondary transfer device 27 includes a secondary transfer roller to which a transfer bias (secondary) is supplied. The secondary transfer device 27 transfers the toner image on the intermediate transfer belt 31 to the sheet S in the transfer nip portion. A transfer cleaner 35 includes a cleaning blade configured to remove toner from the surface of the intermediate transfer belt 31. The transfer cleaner 35 removes toner remaining on the intermediate transfer belt 31 without being transferred to the sheet S in the transfer nip portion. A fixing device 40 includes a heating roller having a heater and a pressure roller configured to press the sheet S against the heating roller. A fixing nip portion for fixing the toner image to the sheet S is formed between the heating roller and the pressure roller. The sheet S to which the toner image is transferred passes through the fixing nip portion. The fixing device 40 fixes the toner image to the sheet S using heat of the heating roller and pressure of the fixing nip portion.

The charger 12 may be a scorotron charger, for example. A predetermined charging bias (charging voltage) is applied to a wire that is disposed opposite the photosensitive drum 11. A casing connected to earth is provided around the wire. Also, a grid is disposed between the wire and the photosensitive drum 11. A surface electric potential (charging electric potential) of the photosensitive drum 11 is controlled in accordance with a charging bias applied to the wire and a grid bias applied to the grid.

<Controller>

Figure 2A:
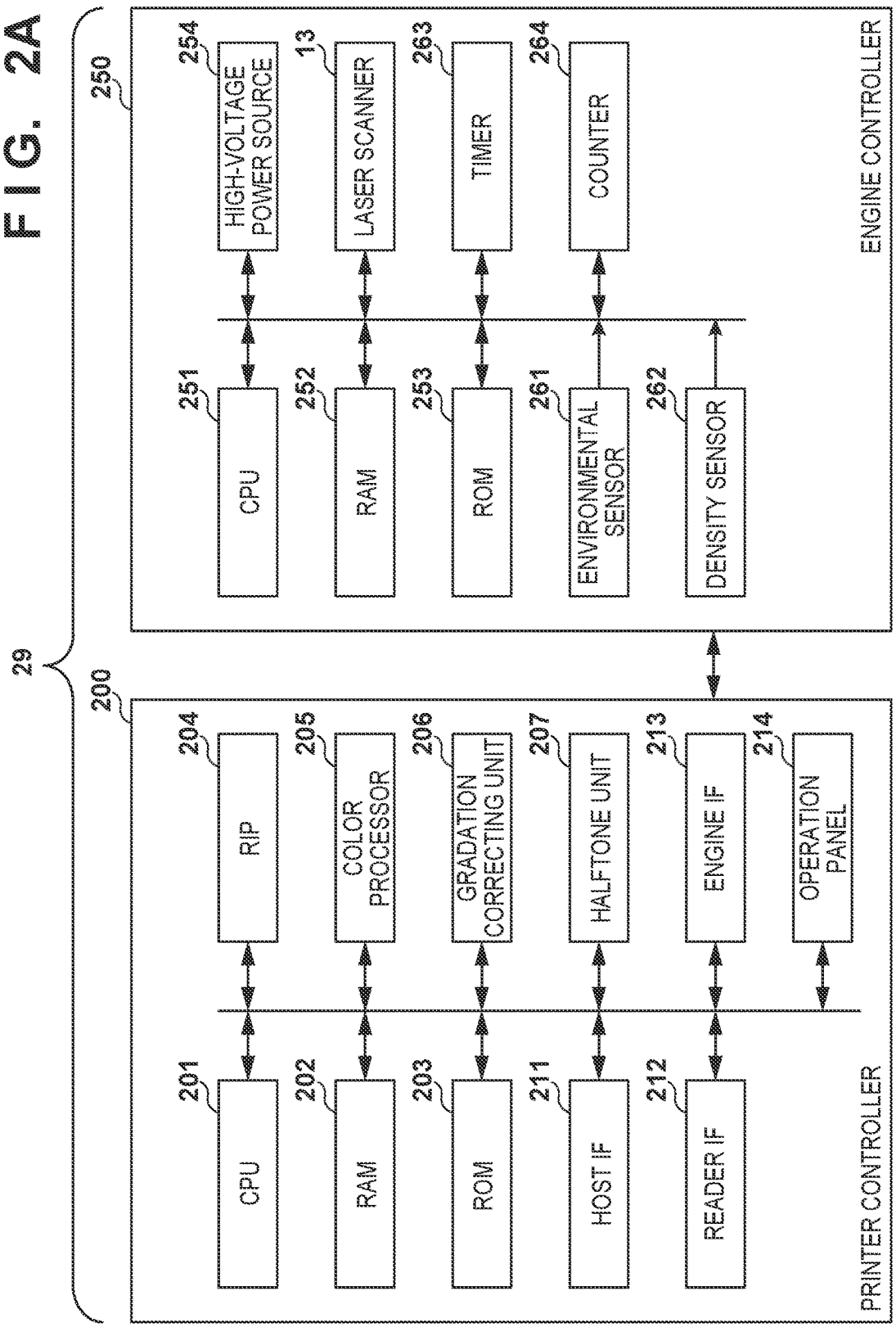
FIGS. 2A to 2C are diagrams illustrating a controller.

FIG. 2A shows components constituting the controller 29. A printer controller 200 is a controller configured to comprehensively control the image forming apparatus 1. An engine controller 250 is a controller configured to mainly control the printer 3. A CPU 201 of the printer controller 200 is a central processing unit configured to control units of the printer controller 200. A RAM 202 is a storage device configured to store image formation conditions, a control table, a conversion table, and the like. A ROM 203 is a storage device configured to store a control program and the like. The printer controller 200 has a plurality of communication circuits. A host IF 211 is a communication circuit for communicating with a host computer and the like, and receives a print instruction and image data. "IF" is the abbreviation for interface. A reader IF 212 is a communication circuit configured to communicate with the reader 2, and receives the image data of the original 21. Also, if a user places a sheet (test chart) provided with a pattern image on the platen glass 22 and executes a reading operation in order to cause the reader 2 to read the pattern image, the reader IF 212 acquires the read data output from the reader 2. An engine IF 213 is a communication circuit configured to communicate with the engine controller 250, and transmits an image signal and receives various measurement data. A RIP (raster image processor) 204 is a processor configured to expand the image data into a bitmap image. A color processor 205 converts a color space of a bitmap image using a color management profile or the like. For example, image data in RGB format is converted into image data in YMCK format. A gradation correcting unit 206 converts image data based on a gradation correction table (γLUT) such that the gradation characteristics of the image formed by the printer 3 are ideal gradation characteristics. A halftone unit 207 executes pseudo-halftone processing on the converted image data, such as a dithering matrix and error diffusion. An image signal output from the halftone unit 207 is output to the engine controller 250 via the engine IF 213. An operation panel 214 is a touch panel display with which an operator of the image forming apparatus 1 inputs an instruction and that displays information to the operator. Note that the color processor 205, the gradation correcting unit 206, and the halftone unit 207 correspond to a plurality of image processes. However, for example, the image forming apparatus 1 may include an image processor configured to execute all of the plurality of image processes. The image processor is a processor that is different from the CPU 201. Also, the image processor may execute portions of the plurality of image processes. Also, the image processor is not limited to having one processor and may have a plurality of processors.

A CPU 251 of the engine controller 250 controls a high-voltage power source 254, the laser scanner 13, and the like in accordance with a control program stored in a ROM 253. A RAM 252 is a storage device that functions as the work area of the CPU 251. The high-voltage power source 254 is a power supply circuit configured to generate a charging bias, a development bias, a transfer bias, and the like. An environmental sensor 261 is a sensor configured to detect environmental information (e.g., temperature, humidity, absolute moisture content) indicating an environment in which the image forming apparatus 1 is installed and an internal environment of the image forming apparatus 1. A density sensor 262 detects the toner density (e.g., a parameter indicating a toner ratio with respect to the carrier) of the developing device 14, and an example thereof is a magnetically permeable sensor. A timer 263 starts measuring time when a print job ends and thereby measures a time period (unattended time period) in which the image forming apparatus 1 does not form images. A counter 264 is a counter configured to count the number of times the developing device 14 is replenished with toner. The image forming apparatus 1 has a replenishment mechanism (not shown). The amount of toner with which the developing device 14 is replenished by the replenishment mechanism executing one replenishment operation is determined in advance. Thus, the printer controller 200 predicts the amount of toner with which the developing device 14 is replenished, based on the count value of the counter 264.

Figure 2B:
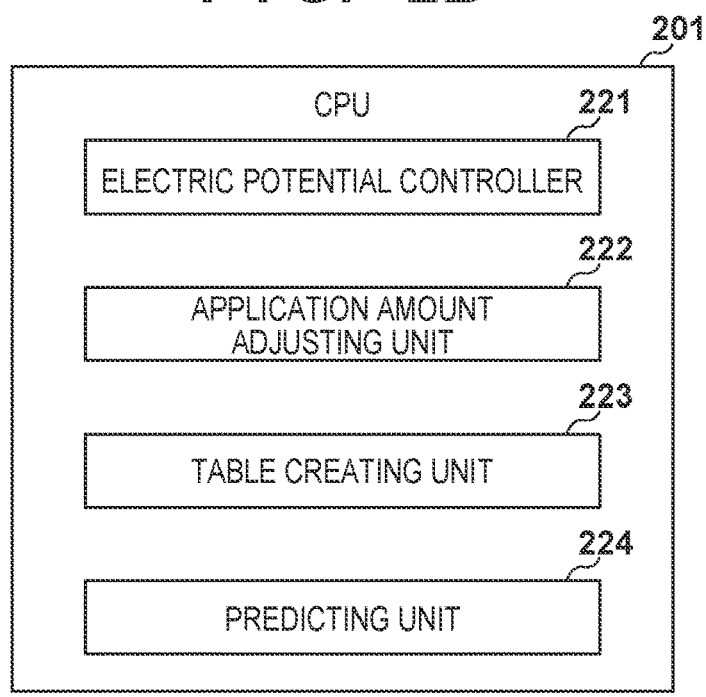

FIG. 2B shows functions realized by the CPU 201 executing a control program. An electric potential controller 221 determines a charging bias VdT, a grid bias Y, a development bias Vdc, and the like in accordance with the environmental information acquired by the environmental sensor 261. The electric potential controller 221 sets these parameters in the high-voltage power source 254. The electric potential controller 221 and the high-voltage power source 254 function as voltage control units. An application amount adjusting unit 222 adjusts the maximum amount of toner (maximum toner application amount) that can be applied to a sheet. The maximum toner application amount changes based on the charging bias VdT, the grid bias Y, and the development bias Vdc. The application amount adjusting unit 222 adjusts the maximum toner application amount by controlling a laser power LPW of the laser scanner 13, for example. The application amount adjusting unit 222 and the laser scanner 13 function as exposure control units.

A table creating unit 223 creates a gradation correction table (γLUT) used by the gradation correcting unit 206. The table creating unit 223 has two creation modes. A first mode is a mode in which a pattern image is created as with a conventional mode, and a gradation correction table is created based on the result of measuring the pattern image. In the present embodiment, the gradation correction table created with the first mode is referred to as a "basic table". A second mode is a mode unique to the present embodiment, and with this second mode, the image density is predicted based on environmental information, image formation conditions and the like, and a gradation correction table is created based on the predicted image density. Prediction of the image density is executed by a predicting unit 224. In the present embodiment, a modification table is created based on the predicted density, and a composite table is created by combining the basic table and the modification table, and set in the gradation correcting unit 206. The gradation correcting unit 206 corrects the gradation of the image data using the set composite table. With the second mode, formation and measurement of the pattern image are not executed, and thus downtime is significantly shortened.

Figure 2C:
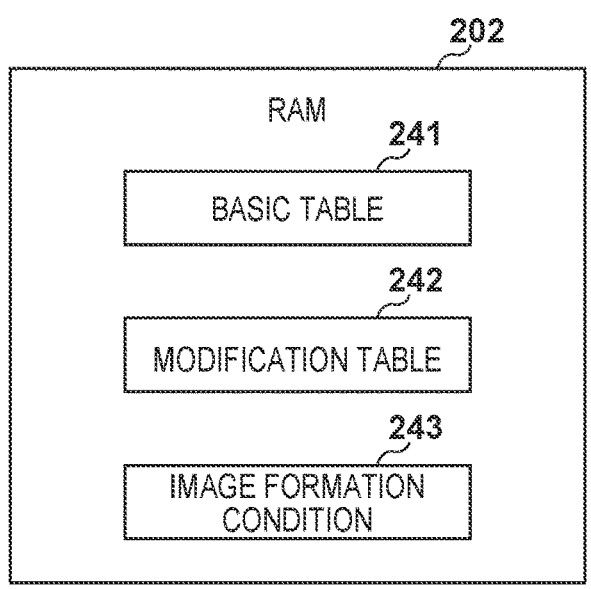

FIG. 2C shows part of the information stored in the RAM 202. The basic table 241 is a gradation correction table created with the first mode. The modification table 242 is a table created based on the predicted density, and is for modifying the basic table 241 and acquiring the composite table. Examples of an image formation condition 243 include a charging bias VdT and a laser power LPW.

<Predicting Unit>

The predicting unit 224 predicts an image density for each gradation level based on an input value (e.g., environmental information or image formation conditions) that fluctuates in association with variations in the image density. In general, the image forming apparatus 1 stops in the evening or at night, and is activated again the next morning. Thus, the image formation condition that is appropriate for the environment of the previous night is different from the image formation condition that is appropriate for the environment of the next morning. The environmental information of the previous night coincides with the environmental information of the next morning on rare occasions, but in general, they are different from each other. Thus, the density of the image formed by the image forming apparatus 1 deviates from the target density. Moreover, while the image forming apparatus 1 successively forms images, the densities of the images converge to a stable density. Also, immediately after returning to a standby mode from an energy-saving mode, there is similarly a possibility that the densities of the images will deviate from the target density. The "energy-saving mode" corresponds to a power saving mode in which the image forming apparatus 1 cannot form an image. The "standby mode" corresponds to a normal mode in which the image forming apparatus 1 can form an image.

Figure 3A:
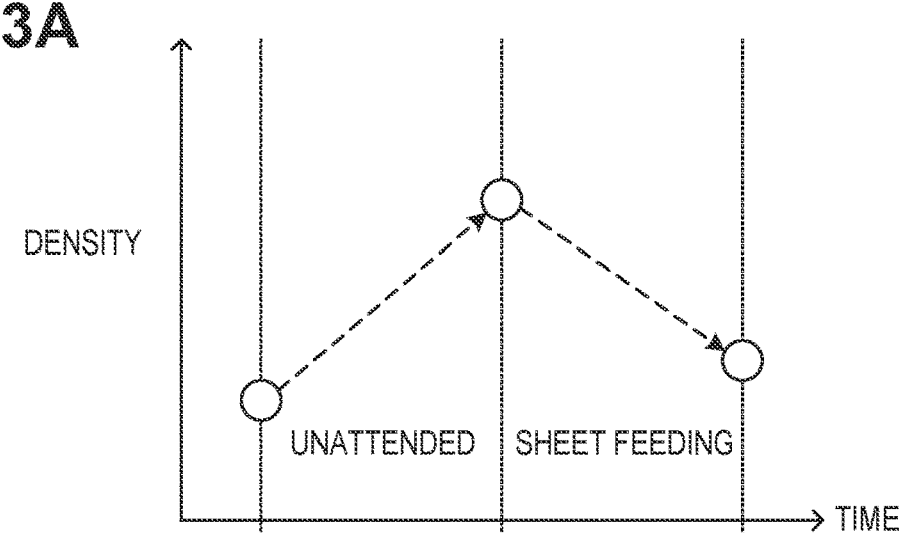
FIGS. 3A to 3C are diagrams illustrating variations in the image density.
Figure 3B:
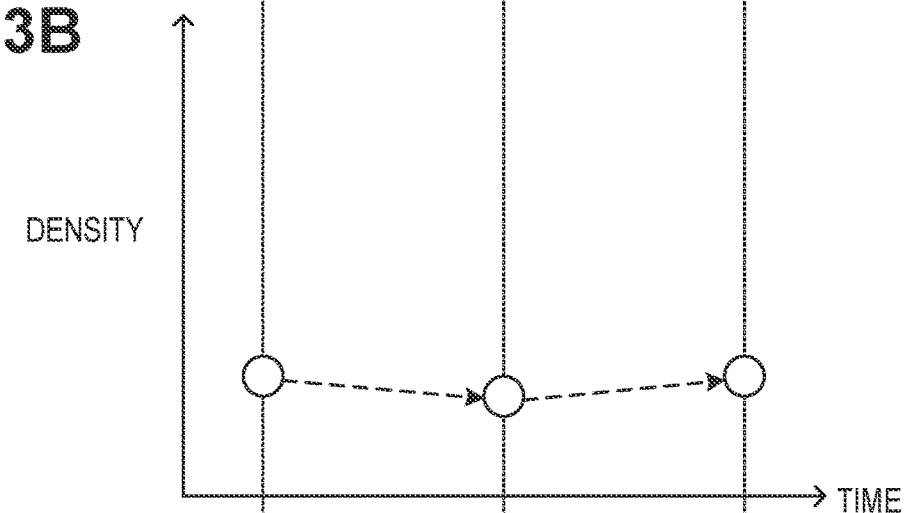
Figure 3C:
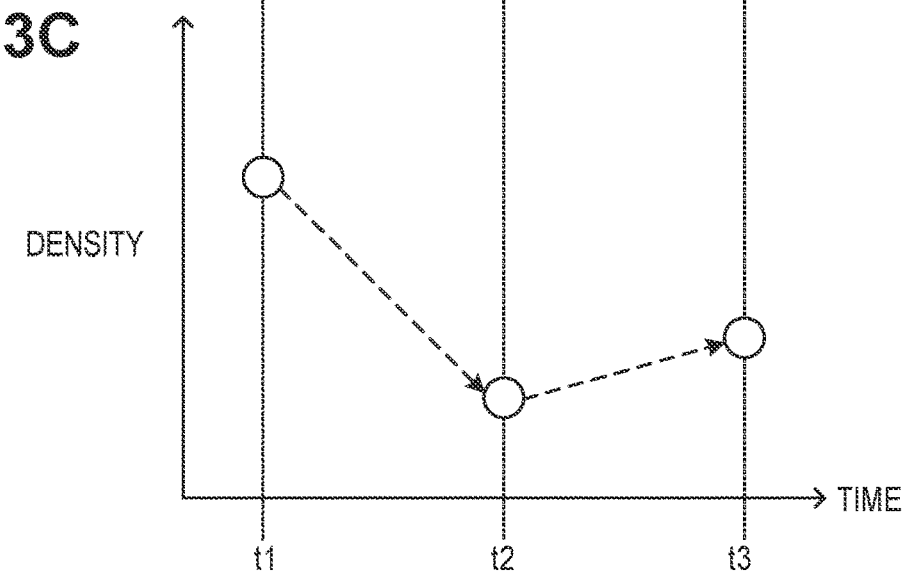

FIGS. 3A to 3C are diagrams showing an example of a change in density. Time t1 represents a time when the image forming apparatus 1 stops. Time t2 represents a time when the image forming apparatus 1 starts up or returns. Time t3 represents a time when the density is stabilized. "Unattended" means that the image forming apparatus 1 is stopped and is not executing image formation. "Sheet feeding" indicates that the image forming apparatus 1 is activated and is executing image formation.

According to FIG. 3A, the density at time t2 increases with respect to the density at time t1, and the density at time t3 decreases with respect to the density at time t2. Examples of a case where such a density change occurs include a case where the image forming apparatus 1 is left unattended for a long time and a case where the image forming apparatus 1 is left unattended in a high humidity environment. According to FIG. 3B, the density at time t1 substantially coincides with the density at time t2 and the density at time t3. An example of a case where such a density change occurs is a case where the environmental change is small while the image forming apparatus 1 is left unattended and the environmental change is also small during sheet feeding. Such a density change is small in a case where an unattended time period is short. According to FIG. 3C, the density at time t2 decreases with respect to the density at time t1, and the density at time t3 increases with respect to the density at time t2. Examples of a case where such a density change occurs include a case where the image forming apparatus 1 is left unattended immediately after toner replenishment is executed and a case where the humidity decreases from time t1 to time t2 and the humidity increases from time t2 to time t3. Here, a problem arises whether the predicting unit 224 uses the density at time t2 as a reference or uses a stable density at time t3 as a reference in order to predict the density from time t2 when the image forming apparatus 1 returns to a state of being capable of image formation to time t3 when the density is stabilized.

Figure 4A:
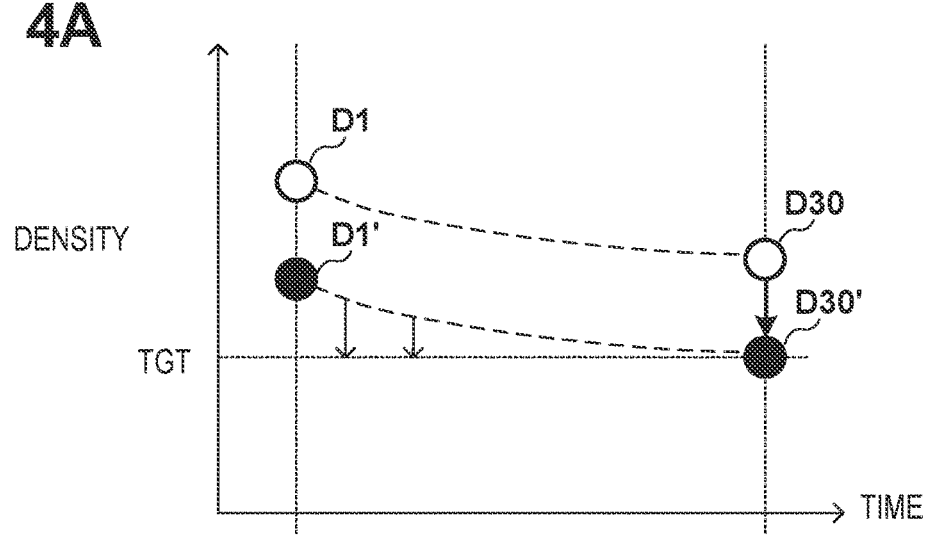
FIGS. 4A to 4C are diagrams illustrating selection of predicted densities.

An example of the case where the image formation condition is corrected such that a stable density D30 is a target density TGT will be described with reference to FIG. 4A. Because the stable density D30 at time t3 is lower than the image density (initial density D1) at time 2, the control amount of a laser power LPW is determined such that the stable density D30 is the target density TGT. That is, the laser power LPW is corrected. Accordingly, the initial density D1 indicated by a white circle changes to an initial density D1' indicated by a black circle. This is the same as the initial density D1 being predicted again based on the control amount of the laser power LPW. Also, a stable density D30' that has been corrected in accordance with the control amount of the laser power LPW is equal to the target density TGT. In view of this, the predicting unit 224 predicts the density at each gradation level at various time points from time t2 to time t3, based on the two corrected predicted densities D1' and D30', and the table creating unit 223 creates a modification table based on the predicted density at each time point. For example, if an image is formed on a first sheet at time t2 and an image is formed on a thirtieth sheet at time t3, the predicting unit 224 predicts image densities D2' to D29' on the second sheet to the twenty-ninth sheet based on the initial density D1' and the stable density D30'. In this manner, the image forming apparatus 1 can modify the gradation correction table while executing image formation.

Figure 4B:
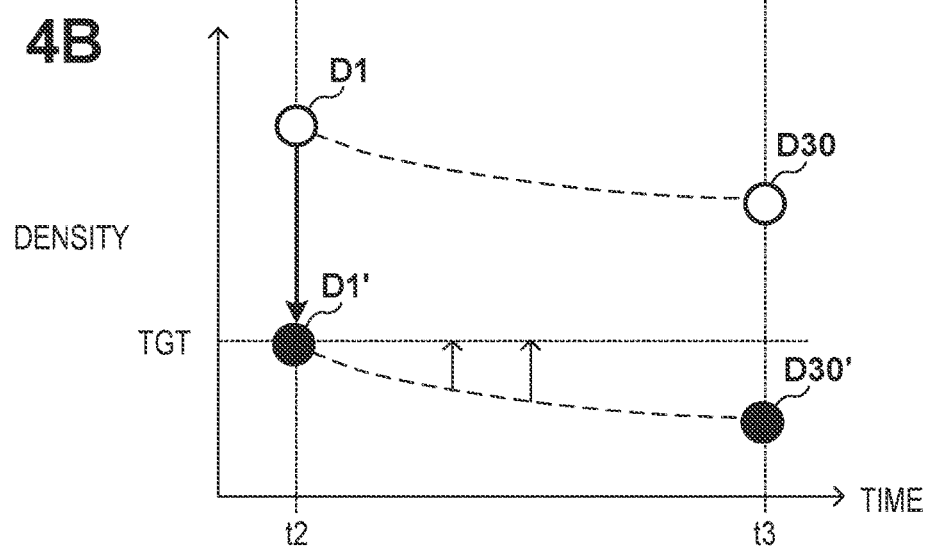

Next, an example of the case where the image formation condition is corrected such that the initial density D1 is the target density TGT will be described with reference to FIG. 4B. The control amount of the laser power LPW is determined such that the stable density D30 is the target density TGT. Herein, the initial density D1 and the stable density D30 that are indicated by white circles change to the initial density D1' and the stable density D30' that are indicated by black circles based on a newly determined laser power LPW. In this case, both the initial density D1' and the stable density D30' are lower than the target density TGT. Thus, it is necessary to increase the density of an image. However, there is a limit to increasing the image density by correcting the gradation correction table. That is, in the case of FIG. 4B, it is necessary for the image forming apparatus 1 to more frequently increase the laser power LPW compared to the case of FIG. 4A. Here, if the image formation condition is modified in order to adjust the maximum density, it is known that densities other than the maximum density also change. This means that the stability of an image will decrease or the control will be complicated. In view of this, the image forming apparatus 1 of this embodiment determines the image formation condition such that a lower predicted density out of the initial density D1 and the stable density D30 is the target density TGT, predicts the image density based on the determined image formation condition again, and corrects a modification table based on the predicted density at each gradation level.

Figure 4C:
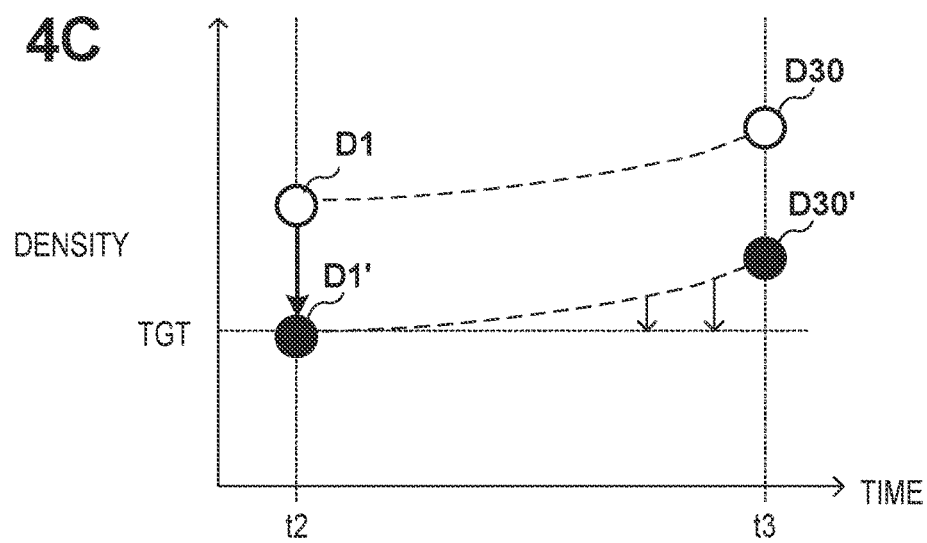

Next, an example of the case where the image formation condition is corrected such that the initial density D1 is the target density TGT will be described with reference to FIG. 4C. Because the initial density D1 is lower than the stable density D30, the image forming apparatus 1 determines the control amount of the laser power LPW such that the initial density D1 is the target density TGT. The predicting unit 224 predicts the initial density D1' and the stable density D30' again based on the determined control amount of the laser power LPW. However, because it is known that the initial density D1' coincides with the target density TGT, the prediction of the initial density D1' again may be omitted. The predicted densities from time t2 to time t3 are all the target density TGT or more. That is, it is possible to update the gradation correction table without correcting the laser power LPW from time t2 to time t3, and the image density is maintained at the target density.

FIG. 5 shows the details of the predicting unit 224. An input processor 500 accepts an input of a parameter (signal value) that is required to predict the density. Examples of the parameter include the image formation condition 243, values measured by the environmental sensor 261, values measured by the density sensor 262, values counted by the timer 263, and values counted by the counter 264.

The input processor 500 has a signal value storage unit 501 and a difference unit 502. The signal value storage unit 501 stores a signal value that serves as a reference of a difference calculation performed by the difference unit 502. The difference unit 502 obtains a difference (a variation amount) between the input signal value and the stored signal value (reference value). For example, a difference between environmental values (e.g., temperature and humidity, absolute moisture content) when the image forming apparatus 1 is activated, a difference between the toner densities in the developing device 14, a difference between image formation conditions (e.g., the laser power LPW or the charging bias Vd), and the like are obtained. A value stored at a timing when the image formation condition and the gradation correction table are generated using a test chart previously is used as the reference value, for example. Note that the unattended time period, the number of times of toner replenishment, the number of formed images that are accumulated, and the like are directly output to a first prediction calculating unit 510. Note that a signal value (correlation parameter) associated with variations in the image density is adopted as the signal value. The input processor 500 outputs a difference to the first prediction calculating unit 510 and a second prediction calculating unit 520. Furthermore, the input processor 500 also supplies a difference between correlation parameters other than the image formation condition to a third prediction calculating unit 550.

The first prediction calculating unit 510 is a predicting unit configured to predict the current density. For example, the first prediction calculating unit 510 predicts the initial density at time t2. The second prediction calculating unit 520 is a predicting unit configured to predict the density when the density is stabilized. That is, the second prediction calculating unit 520 predicts a stable density.

The first prediction calculating unit 510 includes a density storage unit 511 and a prediction function unit 512. The density storage unit 511 stores densities (reference densities) that serve as references for prediction. The prediction function unit 512 predicts the initial density D1 based on a difference (input value) input by the input processor 500 and the stored reference density. The prediction function unit 512 has prediction models (determination conditions). The prediction model converts the input value into a density variation amount. The prediction function unit 512 adds the density variation amount to the reference density, and thereby predicts the initial density D1. The first prediction calculating unit 510 outputs the initial density D1 to a selecting unit 530. The first prediction calculating unit 510 predicts the density at a 100% gradation level showing the maximum density. Here, the first prediction calculating unit 510 may predict the initial density using a change ratio (rate of change) as the input value, for example, instead of a difference.

The second prediction calculation unit 520 includes a density storage unit 521 and a prediction function unit 522. The density storage unit 521 stores densities (reference densities) that serve as references for prediction. The prediction function unit 522 predicts the stable density D30 based on a difference (input value) input by the input processor 500 and the stored reference density. A prediction model of the prediction function unit 522 is different from the prediction model of the prediction function unit 512. The prediction model converts the input value into a density variation amount. The prediction function unit 522 may predict the stable density by adding the density variation amount to the reference density. The second prediction calculating unit 520 outputs the stable density D30 to the selecting unit 530. The second prediction calculating unit 520 predicts the stable density of an image whose gradation level is the same as that for the first prediction calculating unit 510. Here, the second prediction calculating unit 520 may predict the stable density using a change ratio (rate of change) as the input value, for example, instead of a difference.

Also, the first prediction calculating unit 510 and the second prediction calculating unit 520 may predict several densities around the maximum density. These predicted densities are used to determine the control amount in the image formation conditions.

The selecting unit 530 selects a predicted density of either the initial density D1 or the stable density D30, and outputs the selection result to a determining unit 540. As shown in FIGS. 4A and 4B, the difficulty of controlling the image formation condition changes depending on which of the initial density D1 and the stable density D30 is to be corrected to the target density TGT. The selecting unit 530 selects the initial density D1 if the initial density D1 is lower than the stable density D30, and selects the stable density D30 if the stable density D30 is lower than the initial density D1.

The determining unit 540 includes a calculating unit 541, a target density storage unit 542, and a control amount table 543. The target density storage unit 542 stores the target density TGT. The calculating unit 541 obtains a difference between the target density TGT and the predicted density selected by the selecting unit 530, refers to the control amount table 543, and converts the difference into the control amount of the image formation conditions. In this manner, the control amount table 543 is a table for controlling the density difference into the control amount of the image formation conditions. Note that the control amount of the image formation conditions is simply referred to as an "image formation condition" hereinafter. Note that the calculating unit 541 may cause the selecting unit 530 to acquire information indicating which of the initial density D1 and the stable density D30 is lower and to select a model coefficient, which will be described later, based on this information. For example, if the initial density D1 is made to coincide with the target density TGT, a first model coefficient is selected, and if the stable density D30 is made to coincide with the target density TGT, a second model coefficient is selected. The calculating unit 541 may calculate the control amount of the image formation conditions based on the model coefficient and the input value such that the initial density D1 or the stable density D30 coincides with the target density TGT. Alternatively, the control amount table 543 may have a plurality of tables. If the initial density D1 is made to coincide with the target density TGT, the calculating unit 541 refers to a first control amount table and determines the control amount of the image formation conditions. On the other hand, if the stable density D30 is made to coincide with the target density TGT, the calculating unit 541 refers to a second control amount table and determines the control amount of the image formation conditions.

The third prediction calculating unit 550 calculates a predicted density based on the difference (control amount) related to the image formation condition determined by the determining unit 540 and the other remaining correlation parameters. For example, the third prediction calculating unit 550 computes a difference between the image formation condition determined by the determining unit 540 and the image formation condition acquired from the signal value storage unit 501, and supplies the calculated difference to the prediction function unit 552 together with the other remaining correlation parameters. That is, a difference between the image formation conditions determined by the determining unit 540 is input, instead of the difference between the image formation conditions output from the input processor 500. Here, the prediction function unit 552 may receive not only the difference between the image formation conditions determined by the determining unit 540 but also a change ratio (rate of change) about the image formation condition determined by the determining unit 540, for example.

Also, the input processor 500 may be provided between the determining unit 540 and the third prediction calculating unit 550. A density storage unit 551 stores a reference density serving as the reference for density prediction. The prediction function unit 552 has a first prediction model of the first prediction calculating unit 510, and a second prediction model of the second prediction calculating unit 520. The third prediction calculating unit 550 selects one of the first and second prediction models in accordance with which of the predicted densities is selected by the selecting unit 530. If the initial density D1 is lower than the stable density, the third prediction calculating unit 550 selects the second model, and predicts the stable density D30' again. The target density TGT is substituted for the initial density D1'. On the other hand, if the stable density D30 is lower than the initial density D1, the third prediction calculating unit 550 selects the first model, and predicts the initial density D1' again. The target density TGT is substituted for the initial density D30'.

In this manner, the prediction function unit 552 converts the difference between correlation parameters into the density variation amount using the selected prediction model, adds the density variation amount to the reference density, and thereby obtains the predicted density (the initial density D1' and the stable density D30'). For example, in order to predict 10 densities corresponding to ten gradation levels (e.g., 10%, 20%, . . . , and 100%), the third prediction calculating unit 550 may have 20 prediction models. For example, in order to predict the density corresponding to a 10% input level, the third prediction calculating unit 550 uses a prediction model corresponding to the 10% input level.

For example, if the image forming apparatus 1 successively forms images on 30 sheets, the image density is stabilized in some cases. In this case, the third prediction calculating unit 550 predicts the densities of images formed on the second sheet to the twenty-ninth sheet based on the densities of the images formed on the first sheet and the thirtieth sheet. In this case, it is sufficient that the third prediction calculating unit 550 obtains a logarithmic approximation line that connects the density of the image formed on the first sheet (initial density) and the density of the image formed on the thirtieth sheet (stable density), and performs an interpolation operation on the densities of the images formed on the second sheet to the twenty-ninth sheet. The densities of the images to be formed on the second sheet to the twenty-ninth sheet may be determined based on a logarithmic approximation line or a linear approximation line that connects the initial density D1' and the stable density D30'. As described above, the ten image densities corresponding to the input levels from 10% to 100% are obtained for each sheet. The third prediction calculating unit 550 outputs the predicted densities to the table creating unit 223. These predicted density groups form image density characteristics and are used to create the gradation correction table.

The table creating unit 223 creates the gradation correction table based on the predicted density groups. As described above, the table creating unit 223 creates the modification table 242 based on the predicted density groups, creates the gradation correction table by combining the created modification table 242 with the basic table 241, and writes the created gradation correction table into the gradation correcting unit 206.

<Flowchart of Calibration>

Figure 6:
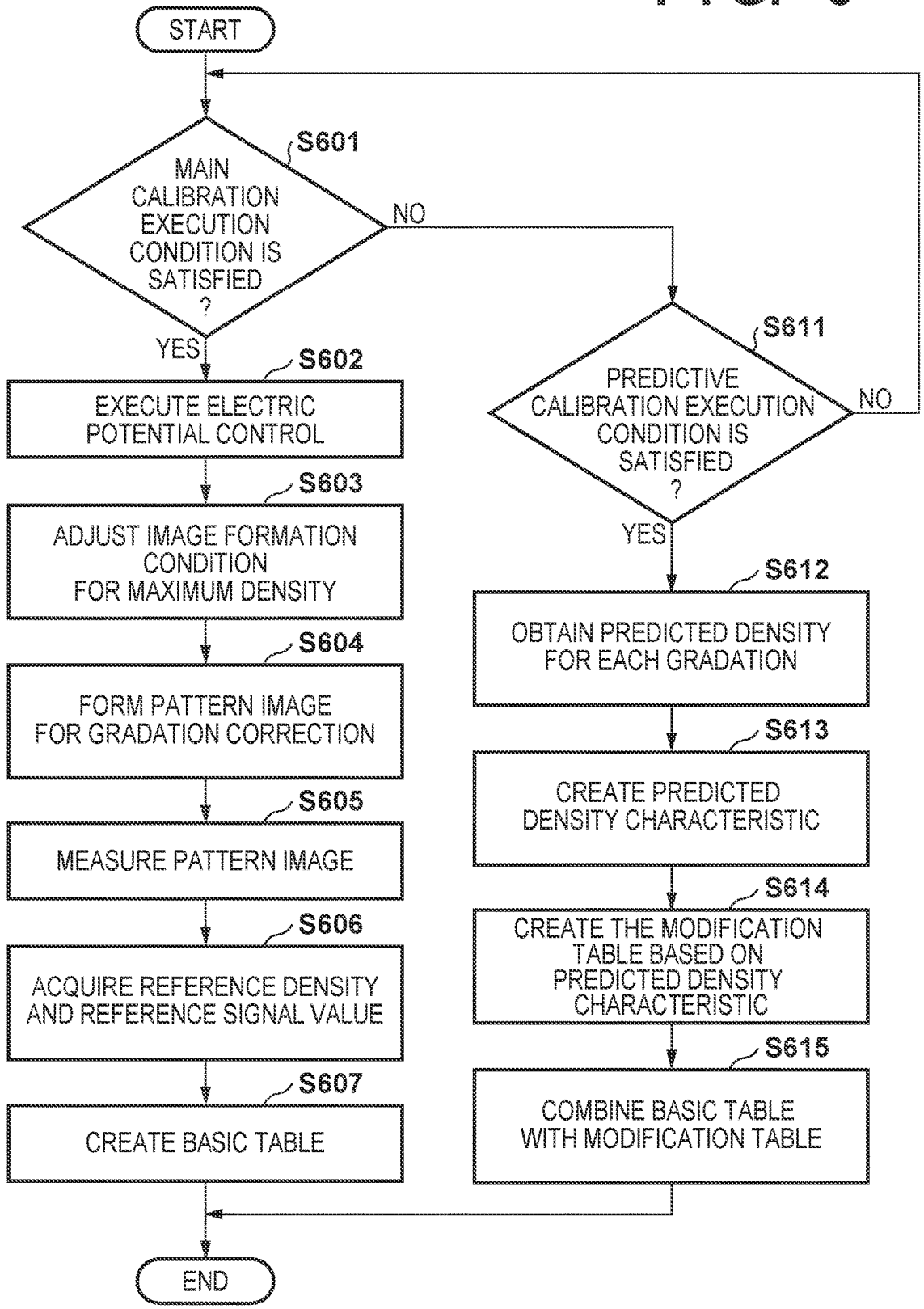
FIG. 6 is a flowchart illustrating calibration.

FIG. 6 is a flowchart showing calibration executed by the CPU 201.

In step S601, the CPU 201 determines whether or not a main calibration (first mode) execution condition is satisfied. The main calibration is processing in which a pattern image is formed on the sheet S, data obtained by reading the pattern image is converted into density data, and the image formation condition is corrected based on the density data. A predictive calibration is processing in which the image formation condition is corrected using a predicted density without forming a pattern image on the sheet S. If the main calibration execution condition is satisfied, the CPU 201 advances to step S602. On the other hand, if the main calibration execution condition is not satisfied, the CPU 201 advances to step S611. For example, if a user inputs a main calibration execution instruction on the operation panel 214, the execution condition is satisfied.

Main Calibration

In step S602, the electric potential controller 221 of the CPU 201 executes an electric potential control. The "electric potential control" refers to determining a charging bias (VdT), a grid bias (Y), a development bias (Vdc), and the like. The CPU 201 determines the charging bias (VdT), the grid bias (Y), and the development bias (Vdc) in accordance with the environmental conditions (e.g., temperature, humidity, and absolute moisture content) acquired by the environmental sensor 261. The electric potential control is known in this technical field, and thus a detailed description thereof will be omitted.

In step S603, the application amount adjusting unit 222 of the CPU 201 adjusts the image formation condition (e.g., laser power LPW) for the maximum density. The maximum density may be referred to as the "maximum application amount". For example, the application amount adjusting unit 222 sets the grid bias (Y) and the development bias (Vdc) that are determined under the electric potential control in the engine controller 250, and controls the printer 3 so as to form a pattern image for adjusting the maximum toner application amount on the sheet S. Then, when the user places the sheet S (test chart) provided with the pattern image on the reader 2 and causes the reader 2 to read the sheet S, the reader IF 212 acquires read data output from the reader 2. The application amount adjusting unit 222 obtains a relationship between the application amount and the laser power LPW based on the read data. Furthermore, the application amount adjusting unit 222 determines the laser power LPW with which the maximum application amount can be obtained, based on this relationship. A method for adjusting the maximum toner application amount is also known in this technical field, and thus a detailed description thereof will be omitted.

In step S604, the table creating unit 223 of the CPU 201 controls the image forming unit 10 through the engine controller 250, and forms a pattern image for gradation correction on the sheet S. The pattern image for gradation correction includes pattern images with 64 gradations for each toner color, for example. When the user places the sheet S (test chart) provided with the pattern image on the reader 2 and causes the reader 2 to read the sheet S, the reader IF 212 acquires read data output from the reader 2.

In step S605, the table creating unit 223 of the CPU 201 obtains the image density of each gradation based on the data obtained by reading the pattern image for gradation correction acquired by the reader IF 212.

In step S606, the table creating unit 223 of the CPU 201 acquires the measured density of the pattern image for gradation correction as the reference density, and acquires a reference signal value (reference measurement value) of each sensor at this time. The table creating unit 223 acquires the reference signal value and a reference value of the image formation condition that was set in the engine controller 250 in order to form the pattern image. Examples of the reference value of the image formation condition include a grid bias, a development bias, and a laser power LPW. The reference density is the image density of each gradation. Examples of the reference signal value include the above-described toner density, count value, and timer value. The reference value and the reference signal value are stored in the signal value storage unit 501. The reference density is stored in the density storage units 511, 521, and 551.

In step S607, the table creating unit 223 of the CPU 201 creates the basic table 241 based on the measured image density such that the gradation characteristics of the image formed on the sheet S coincide with ideal gradation characteristics (gradation target). The table creating unit 223 performs interpolation processing and smoothing processing on the measured image density, and acquires the gradation characteristics of the printer 3, for example. The table creating unit 223 creates the basic table 241 based on the gradation characteristics and the gradation target in all of the density regions. The table creating unit 223 sets the basic table 241 in the gradation correcting unit 206.

Predictive Calibration

The environmental conditions and the state of the image forming apparatus 1 change as the time elapses from when the basic table 241 is created. Thus, the basic table 241 needs to be modified in accordance with these changes. Because the pattern image needs be formed in order to create the basic table 241, downtime occurs. In view of this, the predictive calibration (second mode) is adopted. The predictive calibration is processing in which the gradation correction table is updated without forming the pattern image. By adopting the predictive calibration, downtime is significantly reduced. Note that the modification table 242 is obtained in the predictive calibration, and is combined with the basic table 241 obtained in the main calibration. This corrects (modifies) the gradation correction table.

In step S611, the CPU 201 determines whether or not a predictive calibration execution condition is satisfied. Examples of the execution condition include the power source being turned on, the image forming apparatus 1 returning from a sleep mode (energy-saving mode), variations in the environment, and a preset timing. The execution frequency of the predictive calibration is greater than the execution frequency of the main calibration. If the execution condition is not satisfied, the CPU 201 returns to step S601. On the other hand, if the execution condition is satisfied, the CPU 201 advances to step S612.

In step S612, the predicting unit 224 of the CPU 201 obtains the predicted density. Here, the predicting unit 224 obtains ten predicted densities corresponding to ten gradations.

In step S613, the table creating unit 223 of the CPU 201 creates predicted density characteristics (predicted gradation characteristics) based on the ten predicted densities. For example, the predicting unit 224 obtains the densities of all of the gradations through an interpolation operation using the ten predicted densities. Note that the table creating unit 223 may obtain an approximate equation expressing the predicted density characteristics using the ten predicted densities.

Figure 7A:
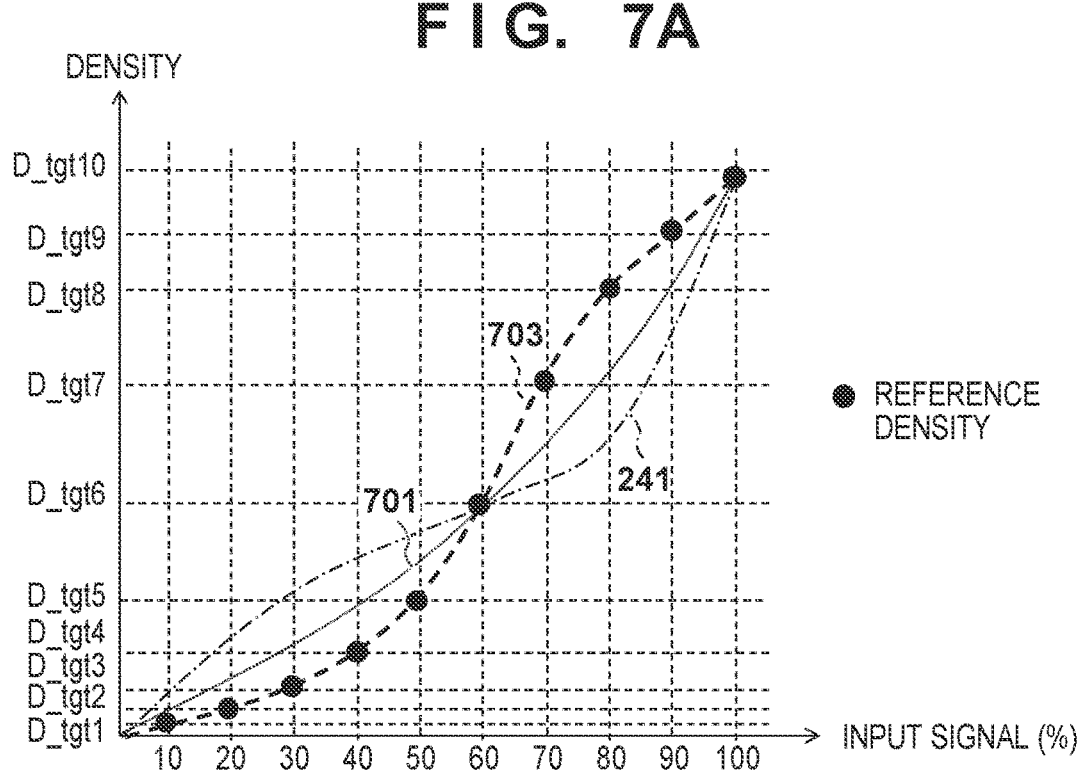
FIGS. 7A and 7B are diagrams illustrating a method for creating a gradation correction table.

FIG. 7A shows gradation targets 701, the basic table 241, and reference density characteristics 703. A horizontal axis represents an input signal corresponding to a gradation level [%]. A vertical axis represents an image density. The reference density characteristics 703 are the reference densities acquired in step S606. The basic table 241 is created by inverting (reversely converting) the reference density characteristics 703 with respect to the gradation targets 701.

Figure 7B:
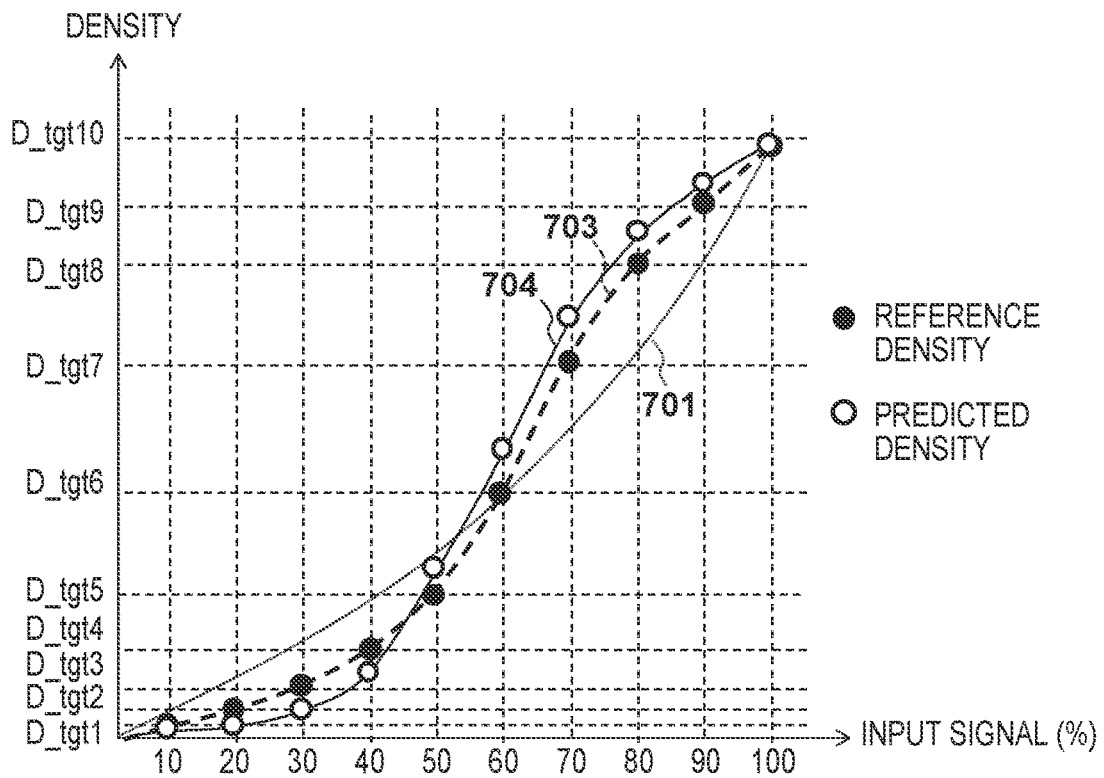

FIG. 7B shows the gradation targets 701, the reference density characteristics 703, and predicted density characteristics 704. The predicted density characteristics 704 include the predicted densities obtained in steps S612 and S613. The density characteristics of the image forming apparatus 1 change from the reference density characteristics 703 to the predicted density characteristics 704 due to an environmental change or the like. Thus, if the gradation correcting unit 206 uses the basic table 241 created based on the reference density characteristics 703, the gradation characteristics cannot be corrected with high accuracy.

In step S614, the table creating unit 223 of the CPU 201 creates the modification table 242 based on the predicted density characteristics 704. For example, in order to correct the predicted density characteristics 704 to the characteristics of the basic table 241, the table creating unit 223 executes reverse conversion of the predicted density characteristics 704 with respect to the characteristics of the basic table 241, and thereby creates the modification table 242.

Figure 8:
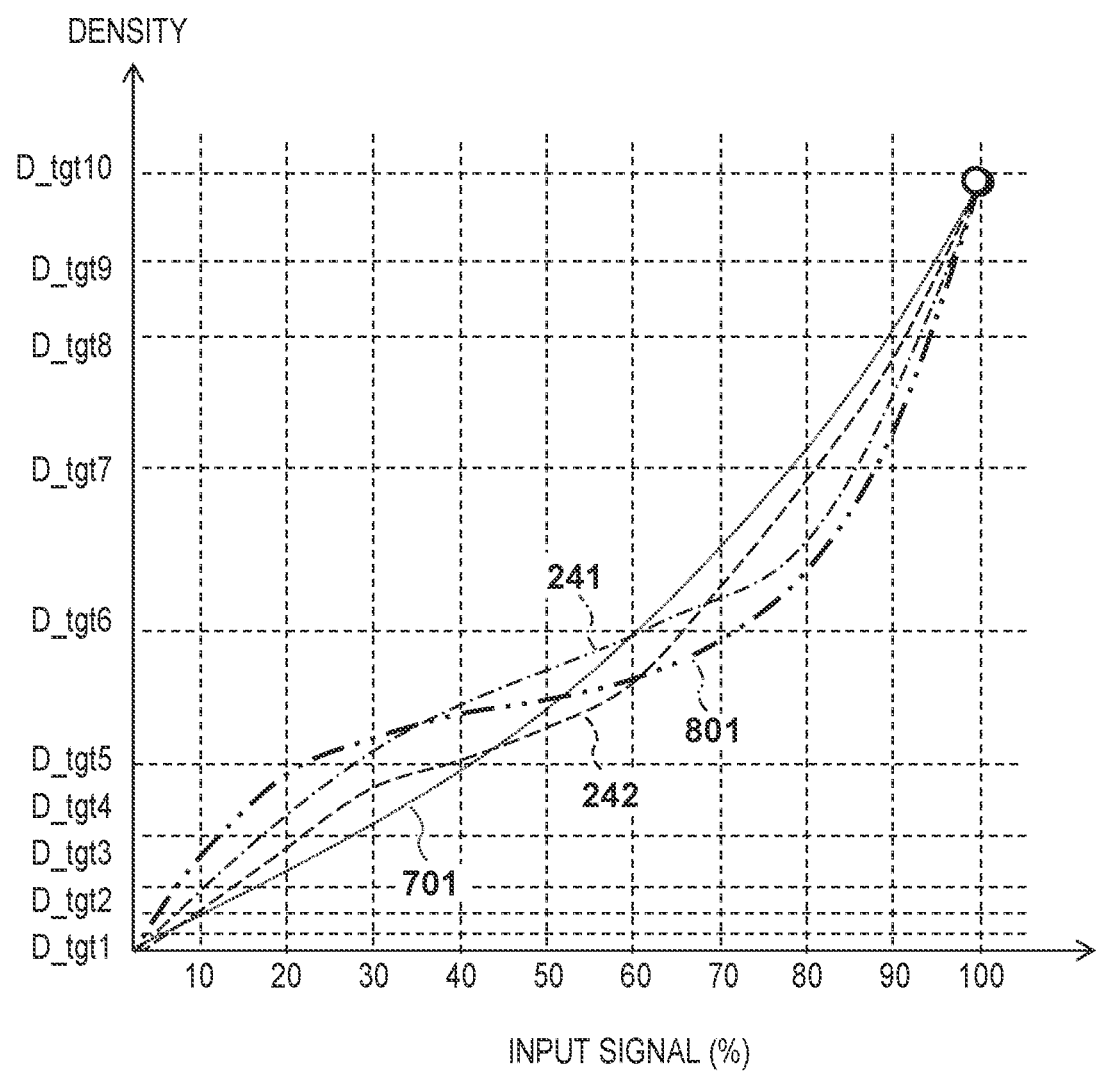
FIG. 8 is a diagram illustrating a method for creating a gradation correction table.

In step S615, the table creating unit 223 of the CPU 201 creates the modified gradation correction table by combining the basic table 241 with the modification table 242. FIG. 8 shows the gradation targets 701, the basic table 241, the modification table 242, and a modified gradation correction table 801. The table creating unit 223 sets the gradation correction table 801 in the gradation correcting unit 206. The gradation correcting unit 206 converts an input image signal to an output image signal using the gradation correction table 801. That is, the gradation correcting unit 206 functions as a converting unit configured to convert the image data based on the gradation correction table 801. The gradation correction table 801 corresponds to conversion conditions for converting the image data.

<Control Amount of Image Formation Conditions>

Figure 9:
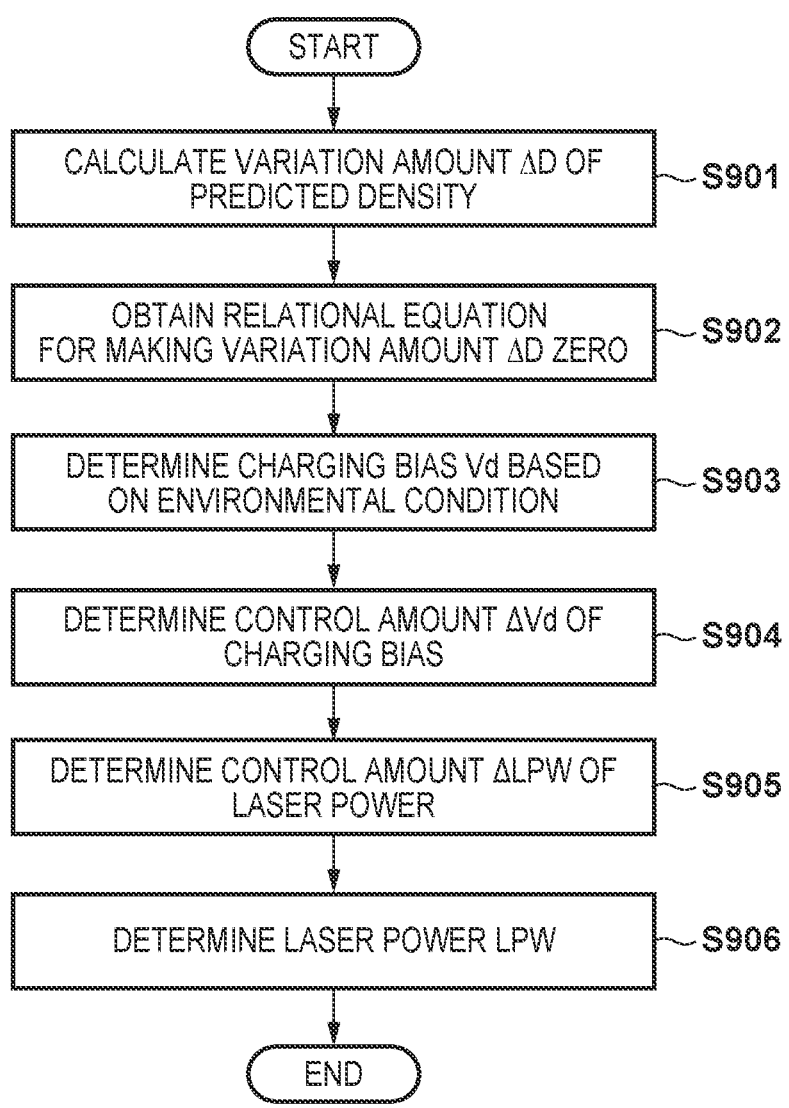
FIG. 9 is a flowchart showing an example of a method for obtaining a control amount.

FIG. 9 shows another example of processing for determining a control amount that is executed by the determining unit 540. Herein, it is assumed that the laser power LPW and the charging bias Vd are determined as the control amounts of the image formation conditions.

In step S901, the calculating unit 541 of the determining unit 540 calculates variation amounts ΔD of the predicted densities. The calculating unit 541 may have calculation models for obtaining the variation amounts ΔD. Herein, examples of a correlation factor contributing to the variation amount ΔD may include the laser power LPW, the toner density in the developing device 14, the charging bias Vd, an apparatus temperature T, a temperature outside the apparatus, and a humidity H outside the apparatus. The calculation model has a model coefficient of each correlation factor.

FIG. 10 is a table showing examples of the correlation factor. In FIG. 10, a reference point refers to each factor value when the reference density is acquired. A prediction point refers to each factor value when the initial density D1 is computed (when the image forming apparatus 1 in a stopped state starts up or returns). Herein, it is assumed that the predicted density at the prediction point is the initial density D1. Difference data is a value obtained by subtracting a reference point from a prediction point. The model coefficient is a coefficient determined through experiments or the like in advance, and is for converting difference data into a predicted difference. Examples of the model coefficient include a first model coefficient for the initial density D1 and a second model coefficient for the stable density D30. These model coefficients can be switched in accordance with the selection result of the selecting unit 530. Herein, as shown in FIG. 4C, the initial density D1 is presumed to be lower than the stable density D30. Thus, the model coefficient in FIG. 10 is the first model coefficient for the initial density D1. The "predicted difference" refers to a component of the predicted density of each factor contributing to the variation amount ΔD. The calculating unit 541 calculates a predicted difference by multiplying difference data by a model coefficient. Also, the calculating unit 541 calculates the variation amount ΔD by adding predicted differences of the factors. The variation amount ΔD is 0.107 in FIG. 10.

In step S902, the calculating unit 541 obtains a relational equation of the control amount for making the variation amount ΔD zero. This is because when the variation amount ΔD is zero, the predicted density coincides with the target density. Herein, among five factors shown in FIG. 10, factors that can be actually controlled are the laser power LPW and the charging bias Vd. The other factors have been already determined at the time of starting up the image forming apparatus 1, and thus cannot be controlled or take time to control. Thus, ΔLPW and ΔVd are determined such that the total of a sum S1 of the predicted difference for the laser power LPW and the predicted difference for the charging bias Vd and a sum S2 of the other predicted differences is zero. In an example shown in FIG. 10, S2=0.050 holds true. Therefore, S1=−S2=−0.050 holds true.

$$S1 = mc1 \times \Delta LPW + mc2 \times \Delta Vd = -S2 \quad (1)$$

Herein, mc1 is a model coefficient for the laser power LPW (=0.0024). mc2 is a model coefficient for the charging bias Vd (=0.0005). Equation (1) is a relational equation to be obtained.

In step S903, the calculating unit 541 determines the charging bias Vd based on the environmental condition. Herein, the control amount table 543 is a table for converting the environmental condition into the charging bias Vd. The "environmental condition" refers to an environmental value acquired by the environmental sensor 261, such as an environmental humidity, for example.

In step S904, the calculating unit 541 determines the control amount ΔVd of the charging bias. For example, the calculating unit 541 may calculate the control amount ΔVd (=−114) by subtracting the charging bias Vd (e.g., 557) at a reference point from the charging bias Vd (e.g., 443) determined based on the environmental humidity.

In step S905, the calculating unit 541 determines the control amount ΔLPW of the laser power using the relational equation below.

$$\Delta LPW = (-S2 - mc2 \times \Delta Vd)/mc1 \quad (2)$$

Herein, ΔLPW is calculated as 3.

In step S906, the calculating unit 541 determines the laser power LPW (=115) by adding the control amount ΔLPW (=3) to the laser power LPW (=112) at the reference point.

Although the charging bias Vd is determined based on the environmental condition in step S903, the laser power LPW may be determined based on the environmental condition. In this case, ΔLPW is determined in step S904, ΔVd is determined in step S905, and the charging bias Vd is determined in step S906. Although Vd and LPW are used as the image formation conditions above, the development bias or a contrast electric potential may be adopted. In this manner, the calculating unit 541 determines a control amount such that the sum (variation amount ΔD) of products of a difference between input values and a model coefficient that is associated with a lower image density out of the initial density D1 and the stable density D30 is zero.

[Summary]

As shown in FIG. 5, the first prediction calculating unit 510 functions as a first predicting unit configured to predict a first image density immediately after starting up or restarting the image forming apparatus 1 based on input values that will fluctuate in association with variations in the density of an image formed by the image forming apparatus 1. The second prediction calculating unit 520 functions as a second predicting unit configured to predict a second image density that is the image density when the density of an image formed by the image forming apparatus 1 is stabilized, based on the input value. The initial density D1 is an example of the first image density. The stable density D30 is an example of the second image density. The determining unit 540 functions as a determining unit configured to determine the control amount of the image formation conditions that corresponds to a lower image density out of the first image density and the second image density. The third prediction calculating unit 550 functions as the third predicting unit configured to predict an image density of each gradation based on the control amount of the image formation conditions that is determined by the determining unit 540. The table creating unit 223 functions as a creating unit configured to create the gradation correction table based on the image density predicted by the third prediction calculating unit 550 and the target density. In this manner, the gradation correction table is created based on the predicted image density in the present embodiment. Thus, it is possible to output the density of an image that is close to the target density even immediately after the image forming apparatus 1 is powered on or immediately after the image forming apparatus 1 returns from an energy-saving mode. Also, an image for measurement is not formed, and thus a time period required to calibrate the image formation conditions is shortened. In general, in calibration, the image forming apparatus 1 forms a pattern image on a sheet or an intermediate transfer member, measures the pattern image, and updates image formation conditions in accordance with the measurement result. Thus, calibration causes a long downtime. According to the present embodiment, it is possible to output the density of an image that is close to the target density even immediately after the image forming apparatus 1 is powered on or immediately after the image forming apparatus 1 returns from an energy-saving mode without forming the image for measurement.

Examples of the input value include an environmental condition relying on an environment in which the image forming apparatus 1 is installed and an image formation condition that is set in the image forming apparatus 1. These correspond to a plurality of parameters associated with variations in the image density. That is, the variation amount of the density associates with the variation amount of the environmental condition or the like, and thus the variation amount of the density can be predicted based on the variation amount of the environmental condition or the like.

The difference unit 502 is an example of the difference unit configured to obtain a difference between the input value and a reference value of the input value that has been acquired in advance using the image for measurement, as the variation amount of the input value. The density storage unit 511 is an example of the first storage unit configured to store the first reference density determined using the image for measurement. The prediction function unit 512 is an example of a first density acquiring unit configured to convert the variation amount of the input value to the variation amount of the image density according to the first prediction model, and acquire the first image density by adding the variation amount of this image density to the first reference density. Similarly, the density storage unit 521 is an example of the second storage unit configured to store the second reference density determined using the image for measurement. The prediction function unit 522 is an example of a second density acquiring unit configured to convert the variation amount of the input value to the variation amount of the image density according to the second prediction model that is different from the first prediction model, and acquire the second image density by adding the variation amount of this image density to the second reference density. In this manner, the first prediction model and the second prediction model are determined through experiments or simulation in advance.

One of a plurality of parameters associated with variations in the image density is the temperature, humidity, absolute moisture content, or the like of an environment in which the image forming apparatus 1 is installed. The environmental sensor 261 is an example of an environment detecting unit. One of the plurality of parameters is the lapse of time from when an image is lastly formed by the image forming apparatus 1. The timer 263 is an example of the measuring unit configured to measure the lapse of time. One of the plurality of parameters is the number of times of replenishment of the developing device 14 with toner (replenishment amount). The counter 264 is an example of the counting unit configured to count the number of times of toner replenishment. One of the plurality of parameters is the density of toner accommodated in the developing device 14. The density sensor 262 is an example of the density detecting unit configured to detect the toner density.

The third prediction calculating unit 550 may predict or correct, again, the first image density and the second image density based on the third reference density determined using the image for measurement, part of the input value, and the control amount of the image formation conditions that was determined by the determining unit 540. Accordingly, a lower image density out of the first image density and the second image density coincides with the target density TGT. The third prediction calculating unit 550 predicts an image density at each time or each number of sheets from time t2 to time t3. For example, the third prediction calculating unit 550 may perform approximation or interpolation between the first image density and the second image density, and thereby predict the image densities from the time or number of sheets relating to this first image density to the time or number of sheets relating to this second image density. Herein, part of the input value refers to remaining input values other than the image formation condition that is set in the image forming apparatus 1. Among the input values, the third prediction calculating unit 550 inputs the control amount of the image formation conditions that is determined by the determining unit 540 to the first prediction model, instead of the image formation condition that is set in the image forming apparatus 1, and predicts the first image density again. Also, among the input values, the third prediction calculating unit 550 inputs the control amount of the image formation conditions that is determined by the determining unit 540 to the second prediction model, instead of the image formation condition that is set in the image forming apparatus 1, and predicts the second image density again. That is, with the third prediction calculating unit 550, the control amount of the image formation conditions is used instead of the variation amount of the image formation condition. The determining unit 540 may include a holding unit configured to hold the target density and a converting unit configured to obtain a difference between the target density and a lower image density out of the first image density and the second image density, and to convert this difference into the control amount. The target density storage unit 542 is an example of the holding unit. The control amount table 543 is an example of the converting unit.

The table creating unit 223 creates the basic table 241 that is a basic gradation correction table based on the result of measuring the image for measurement. The table creating unit 223 creates a modification table based on the target density and the image density predicted by the third prediction calculating unit 550, and updates the gradation correction table by combining the basic table 241 with the modification table 242. The table creating unit 223 may update the gradation correction table every time the image is formed on a sheet. The density of a toner image tends to change significantly immediately after the image forming apparatus 1 starts up or immediately after the image forming apparatus 1 returns. Thus, if the gradation correction table is updated for each sheet, the image density will be easily maintained at the target density.

[Other Embodiments]

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-180395, filed Sep. 20, 2017, which is hereby incorporated by reference herein in its entirety.

What is claimed is:

1. An image forming apparatus comprising:
   a converting unit configured to convert image data based on a conversion condition;
   an image forming unit configured to store a developer, and form, based on the converted image data, an image by using the developer;
   a first sensor configured to measure the developer in the image forming unit;
   a second sensor configured to measure humidity; and
   a controller configured to:
      in a case in which a first state, in which the image forming unit is not allowed to perform image formation, changes to a second state, in which the image forming unit is allowed to perform image formation, in assuming that the image forming unit forms a plurality of images on a plurality of sheets including a first sheet and a second sheet, determine a first density of an image to be formed on the first sheet from a measurement result of the first sensor and a measurement result of the second sensor based on a first prediction model;
      in a case in which the first state changes to the second state, in assuming that the image forming unit sequentially forms the plurality of images on the plurality of sheets including the first sheet and the second sheet, determine a second density of an image to be formed on the second sheet following the first sheet from a measurement result of the first sensor and a measurement result of the second sensor based on a second prediction model different from the first prediction model; and
      generate the conversion condition based on the first density and the second density.

2. The image forming apparatus according to claim 1, wherein
   the controller controls an image formation condition for adjusting a maximum density of the image to be formed by the image forming unit, based on the second density.

3. The image forming apparatus according to claim 1,
   wherein, in a case in which the first density is lower than the second density, the controller controls an image formation condition for adjusting a maximum density of the image to be formed by the image forming unit, based on the first density, and
   wherein, in a case in which the second density is lower than the first density, the controller controls the image formation condition for adjusting the maximum density of the image to be formed by the image forming unit, based on the second density.

4. The image forming apparatus according to claim 1, wherein the controller determines first densities corresponding to a plurality of gradations from the measurement result of the first sensor and the measurement result of the second sensor, based on a first determination condition, and determines second densities corresponding to a plurality of gradations from the measurement result of the first sensor and the measurement result of the second sensor, based on a second determination condition.

5. The image forming apparatus according to claim 1, further comprising:
- a pattern sensor configured to detect a pattern image formed by the image forming unit,
- wherein the controller controls the image forming unit to form the pattern image, controls the pattern sensor to detect the pattern image, and generates the conversion condition based on a detection result of the pattern image by the pattern sensor, and
- in a case in which the first state changes to the second state, the controller generates the conversion condition based on the first density and the second density without forming the pattern image.

6. The image forming apparatus according to claim 1, wherein
the image forming unit enters the sleep mode in a case in which the image forming apparatus is controlled to enter the sleep mode.

7. The image forming apparatus according to claim 1, wherein
the sleep mode changes to the standby mode when the image forming apparatus is powered on.

8. An image forming apparatus comprising:
- a converting unit configured to convert image data based on a conversion condition;
- an image forming unit configured to store a developer, and form, based on the converted image data, an image by using the developer;
- a first sensor configured to measure the developer in the image forming unit;
- a second sensor configured to measure humidity; and
- a controller configured to:
  - in a case in which a sleep mode changes to a standby mode, in assuming that the image forming unit forms a plurality of images on a plurality of sheets, determine a first density of an image to be formed on a first page of the plurality of sheets and a second density of an image to be formed on an nth page of the plurality of sheets based on a time elapsed from when an image is lastly formed by the image forming apparatus, a measurement result of the first sensor and a measurement result of the second sensor; and
  - generate the conversion condition based on the first density and the second density.

9. The image forming apparatus according to claim 8, wherein
the controller controls an image formation condition for adjusting a maximum density of the image to be formed by the image forming unit, based on the second density.

10. The image forming apparatus according to claim 8,
wherein, in a case in which the first density is lower than the second density, the controller controls an image formation condition for adjusting a maximum density of the image to be formed by the image forming unit, based on the first density, and
wherein, in a case in which the second density is lower than the first density, the controller controls the image formation condition for adjusting the maximum density of the image to be formed by the image forming unit, based on the second density.

11. The image forming apparatus according to claim 8, further comprising:
- a pattern sensor configured to detect a pattern image formed by the image forming unit,
- wherein the controller controls the image forming unit to form the pattern image, controls the pattern sensor to detect the pattern image, and generates the conversion condition based on a detection result of the pattern image by the pattern sensor, and
- in a case in which the sleep mode changes to the standby mode, the controller generates the conversion condition based on the first density and the second density without forming the pattern image.

* * * * *